June 29, 1948.  N. W. WHITE  2,444,390
TREE HOLDER DEVICE
Filed Jan. 22, 1947  2 Sheets-Sheet 1
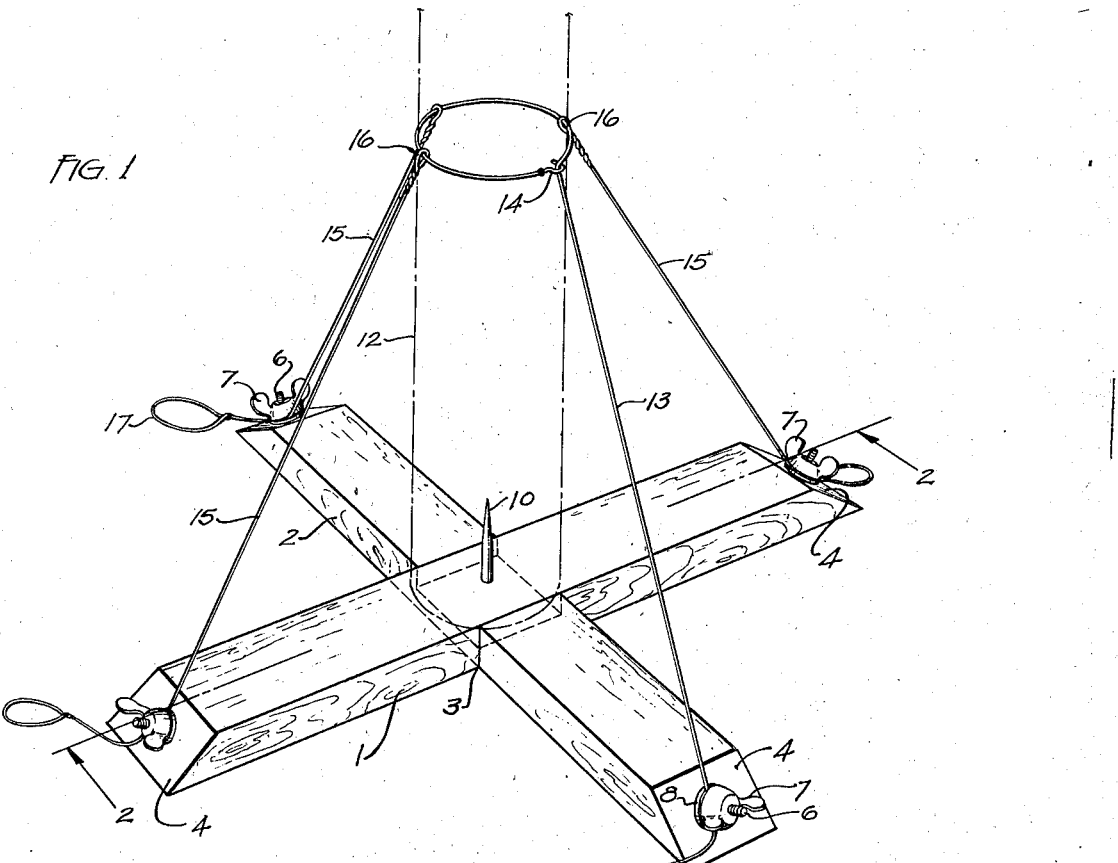
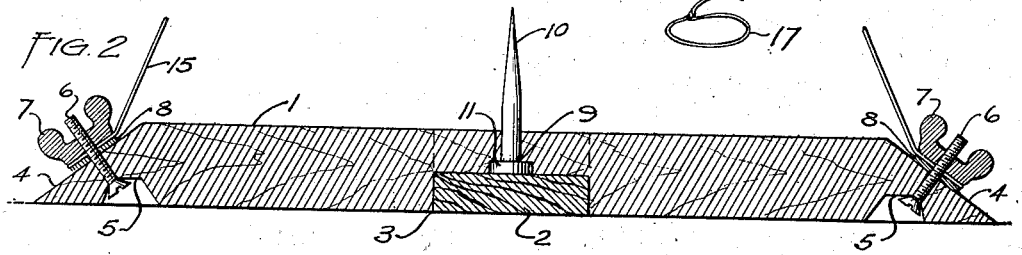
INVENTOR
NORMAN W. WHITE
BY
Semmes, Keegin, Robinson and Semmes
ATTORNEYS June 29, 1948.   N. W. WHITE   2,444,390
TREE HOLDER DEVICE
Filed Jan. 22, 1947   2 Sheets-Sheet 2
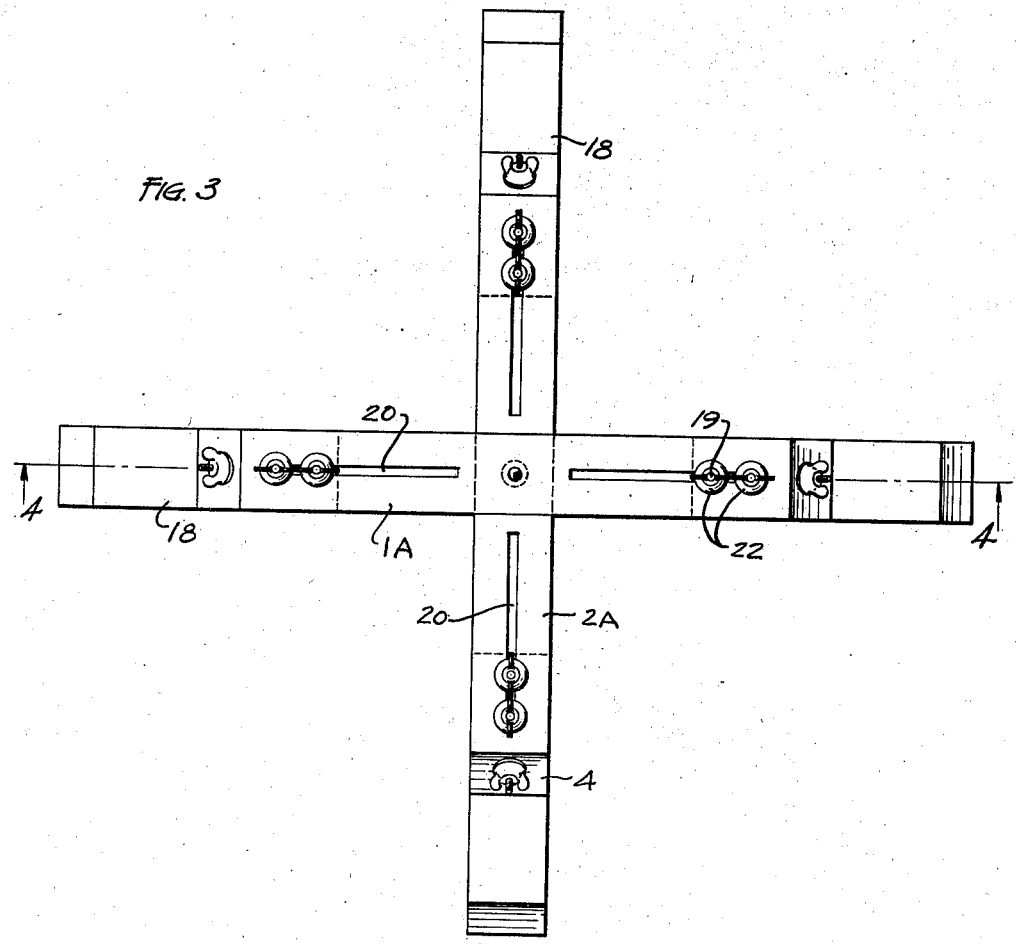
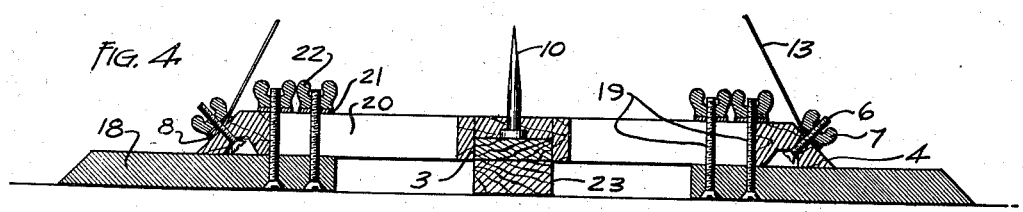
INVENTOR
NORMAN W. WHITE
BY
Semmes, Keegin, Robinson and Semmes
ATTORNEYS Patented June 29, 1948

2,444,390

UNITED STATES PATENT OFFICE 2,444,390

TREE HOLDER DEVICE

Norman W. White, Salem, Mass.

Application January 22, 1947, Serial No. 723,508

6 Claims. (Cl. 248—48)

This invention relates generally to supports for cut shrubs and the like and more particularly to a support or stand for a Christmas tree or similar ornamental cut shrub.

Various types of stands for supporting a Christmas tree in an upright position on the floor have been proposed but most require trimming off at least a portion of the lower branches to attach the tree, which often spoils its ornamental effect. Another disadvantage in the stands heretofore proposed is that they are made in fixed sizes which either require the user to purchase a different size stand for trees of different sizes or else use one which is either too large or too small for the particular tree. Again, some trees are unsymmetrical about their trunks giving them a tendency to tip over. Prior stands have required make-shift ballasting or securement to the floor to compensate for the unbalance of such trees.

Various means have also been proposed for securing the tree in or to the stand. These securements either require nailing through the stand, often damaging it to the extent that it cannot be reused. In the cases where the securing means form a part of the stand assembly, they are made to standards which are not always adaptable to a particular tree.

It is one object of this invention therefore, to provide a simple and inexpensive tree support or stand for holding vertically such cut shrubs as Christmas trees and which is adaptable for trees of different sizes and shapes, which is relatively inconspicuous, and which does not require trimming off branches of the tree for attachment thereto.

Another object of the invention is to provide a tree stand of the above character which positions the base of the tree close to the floor to present a naturally growing appearance to the tree, and is relatively flat adapting the floor space under the tree to decoration.

Another object of the invention is to provide a tree stand of the above character which incorporates means for rigidly attaching and bracing the tree thereon in a vertical position which are adjustable to different size trees, easily operated, and which are relatively inconspicuous.

A further object of the invention is to provide a flat tree stand or base for supporting vertically Christmas trees and the like in which the effective base area is adjustable to the size and natural unbalance of the particular tree which it supports.

With the above and other important objects and advantages in view, the invention consists in the parts and combinations hereinafter set forth with the understanding that various changes and obvious substitutions may be made therein without departing from the spirit of the invention.

In the accompanying drawings in which only preferred means for carrying the invention into practical effect are illustrated:

Figure 1 is a view in perspective of one form of support showing, in phantom lines, the base of a tree trunk mounted thereon.

Figure 2 is a transverse sectional view taken along the line 2—2 of Figure 1.

Figure 3 is a plan view of a modified form of support.

Figure 4 is a transverse sectional view taken along the line 4—4 of Figure 3.

In the form of the invention shown in Figures 1 and 2, the stand comprises a pair of elongated, rectangular arms 1 and 2 made of wood or other suitable material. The arms 1 and 2 are oppositely notched intermediate their length, as indicated at 3, so that they may be assembled in the form of a cross, as illustrated, with flush upper and lower surfaces. The arms 1 and 2 may be permanently assembled such as by gluing, screwing or nailing together, but preferably they are not permanently secured together so that they may be easily parted and bundled for convenient storage in a relatively small space.

The ends of the arms 1 and 2 are preferably beveled to provide downwardly inclined surfaces 4 and are drilled through, perpendicularly to the plane of the surface 4 to an axially registering recess or counterbore 5 in the under surface of the arm. A headed screw 6 is fitted in each of these drilled holes with its head fitting in the recess 5 and its shank projecting outwardly beyond the surface 4. Each screw 6 is fitted with a wing nut 7. Between the wing nut 7 and the surface 4 is positioned a washer 8.

The arm 1, which crosses over the arm 2 in assembled position, is provided with a central aperture 9 counterbored slightly from the bottom of the notch 3. A pointed spike 10 having a flat head 11 is inserted upwardly through the aperture 9. The spike 10 projects above the upper surface of the arm 1 with its head lying within the counterbore and resting on the bottom surface of the notch 3 in the lower arm 2 when the arms are assembled, as seen in Figure 2. The spike 10 need not be very long—just sufficient to prevent lateral displacement of the base of a tree trunk 12 impaled thereon, as shown in Figure 1, and as will be further described.

Associated with the stand is a guying system which serves to hold and maintain the tree in a perpendicular position on the stand. This guying system comprises a primary guy wire 13, preferably of twisted, woven or other substantially flexible construction. Secured to one end of the wire 13 is a rigid wire hook 14 in which the bight of the wire may be positioned to form a running loop for positioning around the trunk of the tree above the stand, as shown in Figure 1. Supplementing the wire 13 are three other guy wires 15, also of flexible construction, and each formed with a small fixed loop or eye through which the bight of the loop in the wire 13 is threaded. The free ends of the wires 13 and 15 are each formed into a hand hold loop 17.

In attaching a tree to the stand, the base of the trunk should be sawed off square and is impaled axially on the spike 10 by pushing the trunk downwardly on the spike. It will be noted from Figure 2 that the lower arm 2 backs up the head of the spike and permits considerable pressure thereon without marring the floor. The hook end of the guy wire is then passed around the trunk of a tree, preferably in the fork formed by a branch or branches with the trunk, and the loop, formed in the wire 13 about the trunk, as described above. The free end of the wire 13 is then passed between the washer 8 and wing nut 7 under one of the screws 6, the wire pulled reasonably taut with the tree vertical by pulling the free end of the wire under the screw 6 by means of the loop 17. This wing nut is now tightened to clamp the wire between the washer and nut. The wire 15 opposite the wire 13 is next passed under the screw 6, in the opposite end of the arm to the screw just tightened, is pulled tight and the wing nut screwed down on the wire. This should bring the tree perpendicular to the arm to which these two guy wires are now attached. If not perpendicular, adjustment may easily be made by slacking off and tightening opposite wires. The above procedure is now followed with the remaining two guy wires 15 and the tree will be firmly anchored perpendicularly to the support.

It will be noted that the guy wires attached to the lower arms of the support exert a tensioning force between the lower arm and tree which urges the lower arm into tight fitting engagement with the upper arm 1 and rigidly secures the two arms together in their assembled position.

The above stand will be found entirely satisfactory for a Christmas tree of average size and symmetry. Often, however, a larger tree is desired than a stand for an average size tree will support. Or often a tree will be unsymmetrical about its trunk because of uneven growth of its branches which will cause it to be unbalanced in a vertical position. For such cases, a stand, such as illustrated in Figures 3 and 4, will be found more desirable since it will occupy no more space for average use than the stand just described, but is adjustable to increase its effective support area to accommodate unusual situations, such as those referred to.

The basic stand, central spike and guy wire system are essentially the same as in Figures 1 and 2 comprising a pair of notch joined arms 1A and 2A substantially the same size and shape as the arms 1 and 2. The arms 1A and 2A, however, each carry a pair of opposed extensions 18 on their lower surfaces which are adjustable longitudinally thereon inwardly and outwardly from the intersection of the arms. Guiding and clamping means for each of the extensions are provided by a pair of spaced, flat head screws 19 counter-sunk into the extension near its inner end. The pair of screws 19 of the extensions respectively extend upwardly therefrom through longitudinal slots 20 in the arms 1A and 2A cut therein from near the notches 3 outwardly to near opposite ends of the arms. Each of the screws 19 are fitted with a washer 21 and a wing nut 22 which operate to draw the extension into close, frictional engagement with its arm.

The extensions may be made of wood or light material such as the main arms of the base but preferably are made of iron or other relatively heavy material to add weight to the stand. The lower arm 2A has a square block 23 secured centrally to its under surface to support the central portion of the stand when the extensions 18 are in extended positions and to serve as a stop for them when in retracted positions. Preferably the extensions have lengths such, that when retracted, their outer ends will be flush with the respective outer ends of the arms and to this end the outer ends of the extensions may be beveled to the same level as the ends of the arms.

The attachment of the tree to the stand shown in Figures 3 and 4 is the same as described above and the operation of the extensions 18, it is thought, will be obvious. It might be pointed out, however, that if a tree is found to be top heavy or unbalanced, which would cause the tree to tip over, the extensions may be all or individually adjusted until the stand will support the tree vertically.

I claim:

1. A stand for decorative cut trees and the like comprising a substantially flat base including a plurality of intersecting arms extending radially from their point of intersection, spike means carried by the base at said point of intersection for penetrating axially the tree trunk, guying means for bracing the tree perpendicularly on the base, said guying means including a plurality of elongated flexible elements, one of said elements having means adjacent one end thereof for forming a running loop about the tree trunk, the other elements respectively having a means at corresponding ends thereof for attaching the same to said loop, and clamping means carried by the base respectively adjacent the extremities of said arms for securing thereto respectively the free ends of said elements.

2. A stand for decorative cut trees and the like comprising a base having a pair of elongated flat arms intersecting each other at mid points thereof at right angles, said arms having interengaging notches for assembling the arms with one overlying the other with flush upper and lower surfaces, a spike carried by the overlying arm and projecting upwardly therefrom at the point of intersection with the underlying arm for penetrating the tree trunk, a head on the spike engaging said underlying arm, guying means for bracing the tree perpendicularly on the base, said guying means including a plurality of elongated flexible elements, one of said elements having means adjacent one end thereof for forming a running loop about the tree trunk, the other elements respectively having a means at corresponding ends thereof for attaching the same to said loop, and clamping means carried by said arms respectively adjacent opposed extremities thereof for securing thereto respectively the free ends of said element.

3. A stand for decorative cut trees and the like comprising a substantially flat base, an upstanding spike member carried thereby substantially centrally thereof for penetrating axially the tree trunk, guy means for extension between the tree trunk and base for staying the tree on the base perpendicularly thereto, a plurality of extension members carried by the base for individual adjustment in the plane thereof radially with respect to the spike member for variably increasing the effective area of said base, and releasable clamping means cooperative between each extension member and base for securing the extension members in adjusted positions thereof to said base.

4. A stand for decorative cut trees and the like comprising a substantially flat base, an upstanding spike member carried thereby substantially centrally thereof for penetrating axially the tree trunk, guy means for extension between the tree trunk and base for staying the tree on the base perpendicularly thereto, a plurality of weighted extension members carried by the base for individual adjustment in the plane thereof radially with respect to the spike member for variably increasing the effective area and varying the weight distribution of said base, and releasable clamping means cooperative between each extension member and base for securing the extension members in adjusted positions thereof to said base.

5. A stand for decorative cut trees and the like comprising a base including an upstanding spike member for penetrating axially the tree trunk and a plurality of flat arm members extending radially outward from said spike member, guy means for extension between the tree trunk and base for staying the tree on the base perpendicularly thereto, a weighted extension member carried by each arm in juxtaposition with the under surface thereof and for longitudinal adjustment relatively thereto for variably increasing the effective area and adjusting the weight distribution of the base, and individual clamping means cooperating between each extension member in adjusted position thereto.

6. A stand for decorative cut trees and the like comprising a pair of elongated flat arm members arranged in overlapping flush relationship in the form of a cross, an upstanding spike member carried by at least the overlying arm for penetrating the tree trunk, guy means extending between the tree trunk and extremities of said arms for staying the tree perpendicularly on the base, each of said arms having a pair of opposed longitudinal slots extending respectively from opposite sides of said spike member to adjacent the extremities of the arms, a pair of opposed extension members juxtaposed on the under surface of each arm, at least two bolt members carried by each extension member in longitudinally spaced alignment thereon and extending respectively through said slots and cooperating therewith for adjusting the extension members longitudinally with respect to the arms to variably increase the effective area of the base, and means including a nut on each bolt and cooperating with the arms for securing the extension members in adjusted position thereon.

NORMAN W. WHITE.

REFERENCES CITED

The following references are of record in the file of this patent:

UNITED STATES PATENTS

| Number | Name | Date |
| --- | --- | --- |
| 1,791,425 | Mundy et al. | Feb. 3, 1931 |
| 2,260,932 | Chulick et al. | Oct. 28, 1941 |